United States Patent
Church et al.

(10) Patent No.: US 11,870,606 B1
(45) Date of Patent: Jan. 9, 2024

(54) CONFIGURING A NETWORK

(71) Applicant: Zoox, Inc., Foster City, CA (US)

(72) Inventors: Zachary Grant Church, San Francisco, CA (US); Ian Chang Hartwig, San Francisco, CA (US); Austin Hendrix, Redwood City, CA (US); Sang Chul Kim, Foster City, CA (US); Jonathon Patrick Klemens, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/986,566

(22) Filed: Nov. 14, 2022

(51) Int. Cl.
*H04L 12/46* (2006.01)
*H04L 45/745* (2022.01)
*H04L 67/12* (2022.01)
*H04L 12/40* (2006.01)

(52) U.S. Cl.
CPC ........ *H04L 12/4641* (2013.01); *H04L 45/745* (2013.01); *H04L 67/12* (2013.01); *H04L 2012/40273* (2013.01)

(58) Field of Classification Search
CPC ... H04L 12/4641; H04L 45/745; H04L 67/12; H04L 2012/40273
See application file for complete search history.

(56) References Cited

U.S. PATENT DOCUMENTS

| 10,244,024 B2 * | 3/2019 | Pal .......................... H04W 4/44 |
| 2018/0048619 A1 * | 2/2018 | Maluf ................. H04L 61/5007 |
| 2020/0389469 A1 * | 12/2020 | Litichever ............... H04W 4/40 |

* cited by examiner

*Primary Examiner* — Normin Abedin
(74) *Attorney, Agent, or Firm* — EIP US LLP

(57) ABSTRACT

There is provided a network comprising a network switch comprising a pre-configured routing table and a first physical port coupled to an endpoint sensor device initiated with an initial network address. One or more processors are coupled to a third physical port of the network switch and are configured to: transmit configuration data for the endpoint sensor device to the third physical port via a first virtual area network. The first virtual area network is associated by the pre-configured routing table with the first physical port and a second virtual area network is associated with a second physical port of the network switch. A command to the endpoint sensor to use a different network address is transmitted by the network switch via the first physical port based at least in part on receiving the configuration data.

20 Claims, 7 Drawing Sheets

CONFIGURING A NETWORK

BACKGROUND

Vehicles may employ multiple sensors distributed in different locations about the vehicle. These sensors may be used for various functions such as detecting component failures or maintenance requirements as well detecting objects in autonomous or semi-autonomous vehicles.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
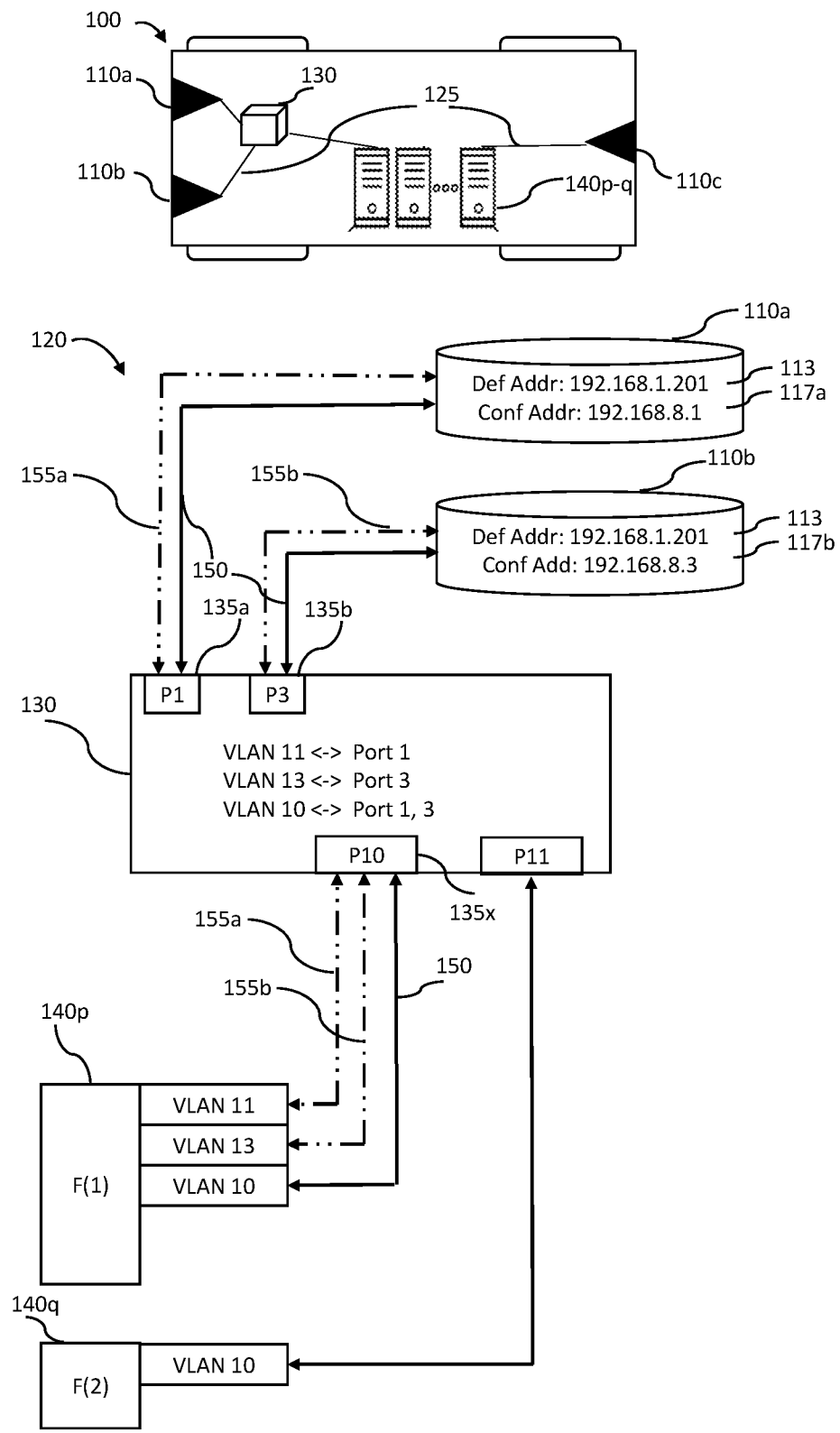
FIG. 1 is a schematic of an example network for a vehicle.

This application relates to techniques, methods, systems, and computer-readable media for configuring a network, which may be in a vehicle, in particular where endpoint sensor devices such as vehicle sensors may initially be configured with the same network address.

It would be useful to be able to improve configuration of endpoint sensor devices in a network where the endpoint sensor devices may be initially configured in the same way, such as with a common default network address. To this end, the inventors have developed a system for configuring a network by updating the network address on common endpoints such as the same type of sensor in order to replace a default or shared initial network address. This can be achieved using respective virtual area networks such as virtual local area networks (VLAN) for configuring each endpoint sensor device and using these to update the network address. The VLAN may be associated by a network switch with respective ports of the network switch which are coupled to a respective endpoint sensor device. This allows a controller to configure the endpoint sensor devices by sending configuration data on the respective VLAN which may cause each endpoint sensor device to receive a command to change its network address to a respective different network address than the default network address. Subsequent communication using these updated network addresses can then proceed with more confidence, including for example over a shared data channel. This approach may avoid having different network states for configuring each endpoint sensor device which in turn may reduce the likelihood of configuration errors such as getting stuck in one of these states. It also enables multiple endpoint sensor devices to be configured simultaneously.

In examples, there is provided a method of configuring a network comprising a network switch comprising a first, a second and a third physical port, an endpoint sensor device coupled to the first physical port where the endpoint sensor device is initiated with an initial network address, and one or more processors coupled, via the third physical port, to the network switch; the method comprising: configuring a routing table in the network switch to associate a first virtual area network with the first physical port and a second virtual area network with the second physical port; transmitting configuration data for the endpoint sensor device from the one or more processors, via the first virtual area network over the third physical port, to the network switch; and transmitting a command for the endpoint sensor device to use a different network address than the initial network address from the network switch to the endpoint sensor device via the first physical port and using the initial network address, based at least in part on receiving the configuration data.

In examples, the one or more processors may be configured to transmit, via a third virtual area network over the third physical port, to the network switch, operational data, wherein the third virtual network is associated by the pre-configured routing table with the first and the second physical ports; and the network switch may be configured to, based at least in part on receiving the operational data, transmit the operational data to at least the first physical port using the different network address.

In examples, the one or more processors may be configured to transmit, via the first virtual area network over the third physical port, to the network switch, operational data; and the network switch may be configured to, based at least in part on receiving the operational data, transmit the operational data to the endpoint sensor device via the first physical port using the different network address.

In examples, the network switch may be configured to prevent transmission of data from the endpoint sensor device to the one or more processors or another endpoint sensor device using the initial network address.

In examples, the network may comprise a second network switch comprising first, second and third physical ports and a second pre-configured routing table; a second endpoint sensor device coupled to the first physical port of the second network switch, wherein the second endpoint sensor device is initiated with the initial network address; the one or more processors coupled, via the third physical port of the second network switch, to the second network switch, wherein the one or more processors may be configured to: transmit, via a fourth virtual area network over the third physical port of the second network switch, to the second network switch configuration data for the second endpoint sensor device wherein the fourth virtual area network is associated by the second pre-configured routing table with the first physical port of the second network switch; and wherein the second network switch may be configured to, based at least in part on receiving the configuration data, transmit, to the second endpoint sensor device via the first physical port of the second network switch and using the initial network address, a command for the second endpoint sensor device to use another different network address than the initial network address.

In examples, the one or more processors may be configured to: transmit, via a third virtual area network over the third physical port of the first network switch, operational data to the first network switch; and wherein the first network switch may be configured to, based at least in part on receiving the operational data, transmit the operational data to at least the first and the second physical ports of the first network switch; transmit, via a fifth virtual area network over the third physical port of the second network switch, to the second network switch, operational data; and wherein the second network switch may be configured to, based at least in part on receiving the operational data, transmit the operational data to at least the first and the second physical ports of the second network switch.

In examples, the network may comprises: a second network switch comprising first, second and third physical ports and a second pre-configured routing table; a second endpoint sensor device coupled to the first physical port of the second network switch, wherein the second endpoint sensor device is initiated with the initial network address; the one or more processors coupled, via a fourth physical port of the first network switch to the third one of the physical ports of the second switch, to the second network switch; wherein the one or more processors may be configured to: transmit, via a sixth virtual area network over the third physical port of the first network switch, to the second network switch, configuration data for the second endpoint sensor device wherein the sixth virtual area network is associated by the first pre-configured routing table with the fourth physical port of the first network switch; and the second network switch may be configured to, based at least in part on receiving the configuration data, transmit, to the second endpoint sensor device via the first physical port of the second network switch and using the initial network address, a command for the second endpoint sensor device to use another different network address than the initial network address.

In examples, there is provided a vehicle comprising: a network switch comprising physical ports and a pre-configured routing table; an endpoint sensor device coupled to the first physical port, wherein the endpoint sensor device is initiated with a network address that is common to another endpoint sensor device, the another endpoint sensor device being one that can be coupled to the second physical port; one or more processors coupled, via a third physical port, to the network switch, wherein the one or more processors are configured to: determine that the endpoint sensor device is coupled to the network switch using the common network address; transmit, via a first virtual area network over the third physical port and to the network switch, configuration data for the endpoint sensor device, wherein the first virtual area network is associated by the pre-configured routing table with the first physical port and wherein a second virtual area network couples the one or more processors to the network switch over the third physical port and is associated by the pre-configured routing table with the second physical port; and wherein the network switch is configured to, based at least in part on receiving the configuration data, transmit, to the endpoint sensor device via the first physical port and using the common network address, a command for the endpoint sensor device to use a different network address than the common network address. In examples, the first and the second physical ports may correspond to respective locations on the vehicle for endpoint sensor devices coupled to said ports.

In examples, there may be provided a vehicle comprising first and second sensor pods each comprising one or more endpoint sensor devices, the one of more endpoint sensor devices of the first sensor pod coupled to the first network switch and the one or more endpoint sensor devices of the second sensor pod couple to the second network switch.

In examples, the virtual area networks are virtual local area networks (VLAN).

The techniques described herein can be implemented in a number of ways. Example implementations are provided below with reference to the accompanying figures. Although discussed in the context of an autonomous vehicle, the methods, apparatuses, and systems described herein can be applied to a variety of systems and is not limited to autonomous vehicles. In another example, the techniques can be utilized in an aviation or nautical context. Additionally, the techniques described herein can be used with real data (e.g., captured using sensor(s)), simulated data (e.g., generated by a simulator), or any combination of the two.

To expand on the above, FIG. 1 illustrates a schematic of an example vehicle 100. The vehicle comprises a network 120 which may be employed in an autonomous, semi-autonomous or manually controlled vehicle 100 to couple multiple endpoint sensor devices 110a-110c with one or more controllers 140p, 140q. A network switch 130 and wiring harnesses 125 may be used to electrically connect various parts of the network 120. As will be appreciated, vehicle 100 may comprise additional components not shown in FIG. 1, for example, the components depicted by and described in relation to vehicle 602 of FIG. 6.

In an example, the one or more processors 140p, 140q such as controllers may comprise a main or master controller 140p which, amongst other functions, may control configuration and operation of the network 120. Other controllers may include a vision controller 140q which uses operational data from some endpoints to generate a model of the environment in which the vehicle 100 is operating, including surrounding objects. There may also be an engine management controller, a battery controller and other types of specialized controllers. Some of the controllers 140p, 140q may be configured to only listen to operational data from the endpoint sensor devices 110a, 110b and other controllers, whilst some controllers may be configured to control the endpoint sensor devices or other controllers.

In an example, the endpoint sensor devices 110a-110b may correspond to endpoint sensor devices such as LIDAR sensors, which are distributed about the vehicle 100 in different locations. The endpoint sensor devices may be used to generate operational data corresponding to distance and position information of objects within an environment in which the vehicle 100 is operating. In the example of a road-based vehicle, the environment may comprise urban and rural roads, carparks, service forecourts and the like. In other examples the vehicle may be arranged to operate in a nautical or airspace environment. In other examples, the endpoint sensor devices may be used to generate operational or maintenance data about various components of the vehicle.

Some endpoint sensor devices 110a-110c may have limited networking functionality, for example only supporting one configurable Internet Protocol (IP) network address and not supporting virtual networking functionality such as Virtual Local Area Networks (VLAN) or Dynamic Host Configuration Protocol (DHCP). In some examples, endpoint sensor devices of the same type may be initially configured with a common default network address (113).

Each endpoint sensor device 110a-110b will correspond to a known location on the vehicle in order for its operational data to be correctly interpreted by the controller 140p, 140q. In order for the controller 140p, 140q to distinguish between endpoint sensor devices at different locations, the endpoint sensor devices 110a, 110b may be configured with respective network addresses (117a, 117b) associated with those vehicle locations and endpoint types. Whilst it is possible to configure the network address of each endpoint sensor device by connecting sequentially to each device, this may be time consuming and error prone.

One or more wiring harnesses 125 may be used to connect the endpoint sensor devices 110a-110c to the vehicle network 100, using a respective physical port to which an endpoint sensor device may be electrically coupled. Each physical port may be associated with a specific location or position of the vehicle, and the physical port or corresponding part of the wiring harness may be key coded with its location and/or endpoint sensor device type so that an installer knows what type of endpoint sensor device to install at that physical port.

The vehicle network 120 may comprise a network switch 130 coupled between multiple endpoint sensor devices 110a, 110b and the controller 140p, 140q. The network switch may comprise multiple physical ports 135a, 135b which may be coupled to the above noted physical ports to which the respective endpoint sensor devices 110a, 110b are coupled. The physical ports of the network switch may be coupled to the endpoint sensor devices using respective dedicated wires of the wiring harness 125.

The network switch 130 may configure and operate multiple logical channels on parts of the vehicle network 120. In one example, this configuration may be implemented with different VLAN for each endpoint sensor device. A single VLAN 150 may be used for communicating operational data with the endpoint sensor devices 110a, 110b as these may not have VLAN functionality and so would not be able to distinguish between different VLANs.

This single VLAN or data channel 150 may also be used for communicating between the controllers 140p, 140q and the network switch 130. One or more other VLANs may be used for communicating with controllers 140p, 140q having VLAN functionality and the network switch 130 in order to configure respective endpoint sensor devices.

By configuring the network switch 130 to map data packets to or from a respective physical port 135a, 135b to one of the other VLAN between the network switch and the controller 140p a configuration channel 155a, 155b can be defined for each endpoint sensor device 110a, 110b. Each configuration channel 155a, 155b enables dedicated communication between the controllers 140p and a respective endpoint sensor device 110a, 110b, without these communications involving another endpoint sensor device. For example, VLAN 10 may be used as part of a data channel 150 common to the multiple endpoint sensor devices 110a, 110b. Operational data sent by controller 140p on VLAN 10 may be multicast by the network switch 130 onto its physical ports coupled to endpoint sensor devices. VLAN 11 may be used for a configuration channel 155a for endpoint sensor device 110a where packets to/from this VLAN may be mapped by the network switch to/from port 1 135a so that the packets travel only to/from endpoint sensor device 110a along a dedicated wire or other physical channel to port 1 of the network switch. Similarly, VLAN 13 may be used for a configuration channel 155b for endpoint sensor device 110b where packets to/from this VLAN may be mapped by the network switch to/from port 3 135b so that the packets travel only to/from endpoint sensor device 110b along a dedicated wire or other physical channel to port 3 of the network switch. In this way, respective configuration channels 155a, 155b may be configured between each endpoint sensor device 110a, 110b and the controllers 140p.

Another physical port 135x (port 10) of the network switch may be used to couple to a controller 140p. The physical ports 135a, 135b, 135x may be connected to respective endpoint sensor devices using respective lengths of Ethernet cable or alternatively bespoke harness wiring for example. Similarly, the data channel 150 may be set up between another controller 140q and another port P11 of the network switch using VLAN 10 and the multicasting mapping in the network switch associating VLAN 10 with physical ports P1 and P3.

The configuration channels 155a, 155b may be used by the controller 140p to reconfigure the network address of a respective endpoint sensor device 110a, 110b. Where the endpoint sensor devices initially have a common default network address, it may not be possible to individually address them over the vehicle network. However, by using a configuration channel 155a, the corresponding endpoint sensor device 110a can be individually addressed and controlled by a controller 140p using its initial default address, without also addressing or communicating with the other endpoint sensor devices, even though they may have the same initial default address. This may be because the network switch maps these configuration channels to respective physical ports which are only coupled with the intended endpoint sensor device 110a. The controller 140p can then instruct the endpoint sensor device 110a via its configuration channel 155a to change its network address to distinguish it from other endpoint sensor devices within the vehicle network.

Once all of the endpoint sensor devices have been reconfigured with distinct respective network addresses, they may then transmit operational data such as sensor readings to the controllers 140p, 140q using their updated network addresses. The endpoint sensor devices may also be directly addressed by the controllers 140p, 140q using their respective updated addresses. This allows traffic for different endpoint sensor devices 110a, 110b to be carried on the same logical channel. For example, once the endpoint sensor devices have been configured with updated network addresses using their respective configuration channels 155a, 155b, further communications may be implemented using a common data channel 150 VLAN 10. Using a common data channel for operational data simplifies the network architecture and simplicity of configuration at the endpoint sensor devices and the network switch which reduces the likelihood of design error and makes debugging easier. A simplified architecture also simplifies testing, for example to identify a fault in the vehicle. However, in an alternative arrangement, the configuration channels may also be used for carrying operational data to/from the respective endpoint sensor devices.

This approach to reconfiguring endpoint sensor devices when they are simultaneously connected and talking/listening to the vehicle network enables automation of vehicle network configuration and reduces the time that this takes. This approach also enables the use of multiple simple endpoint sensor devices such as sensors with a limited communications stack. Furthermore, this approach allows manufacturing and deployment or configuration of vehicles to be independently optimized. For example, during manufacturing it may be desirable to use a reduced labeling or identifier set to reduce complexity and improve logistics. This may encourage the use of multiple common components having the same configured settings or parameters, such as sensors of the same type having the same network address. Being able to perform some of the configuration after manufacture of a vehicle simplifies manufacturing and reduces costs. This also facilitates the retention of existing factory tools for manufacturing which optimizes simplicity and cost, whilst allowing for automating vehicle network configuration during deployment.

It may be also helpful to be able to perform this type of configuration when some parts of a vehicle are replaced, for example due to accident damage or faults. In this example one or more endpoint sensor devices 110a, 110b may be replaced whilst the rest of the endpoint sensor devices 110c remain intact and their previous configuration with a respective network address retained. The replacement endpoint sensor devices 110a, 110b will have the same default network address and the already configured configuration channels 155a, 155b can be re-used to reconfigure their network addresses. The use of configuration channels 155a, 155b may also be useful for reconfiguring or testing endpoint sensor devices.

The network switch 130 may be configured to prevent the endpoint sensor devices from communicating with other endpoint sensor devices on the data channel until it has been reconfigured with an updated network address. This could be implemented by configuring the network switch to ignore all received packets using the default IP address of the endpoint sensor devices. Another implementation is described in more detail with respect to FIG. 5. The prevention of premature communications from endpoint sensor devices may prevent communications from one endpoint sensor device being received and potentially acted upon by another endpoint sensor device, which may cause errors or other unintended consequences.

In an example, the vehicle network may be configured to divide endpoint sensor devices into multiple subsets, such as a subset for each quadrant of the vehicle 100. Each subset of endpoint sensor devices may use a respective data channel which may assist with prioritizing and load balancing traffic. In an example, the vehicle network may comprise more than one network switch. Each network switch may be configured to couple with a subset of endpoint sensor devices. These examples are described in more detail with respect to FIG. 7.

In an example, the default and respective endpoint sensor device network addresses 113, 117a, 117b may be Internet Protocol (IP) addresses. Multiple controllers 140p, 140q may be configured to listen to the data channel 150 and one of the controllers 140p may be configured to also send packets on the data channel 150 and the configuration channels 155a, 155b which may be implemented using respective Linux namespaces. Packets on the data channel 150 may be configured as UDP multicast and packets on the configuration channels may be configured as TCP unicast.

Figure 2:
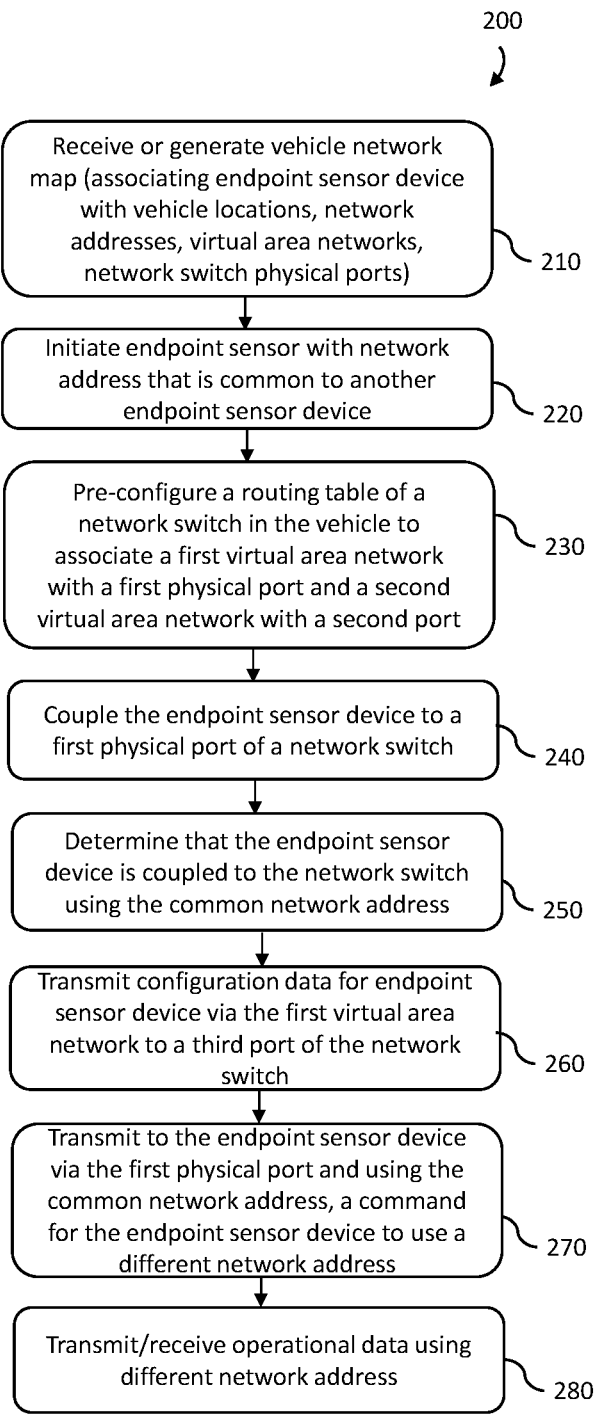
FIG. 2 is a flowchart depicting an example method of configuring a network.

FIG. 2 is a flowchart depicting an example method 200 of configuring a vehicle, such as the vehicle 100 of FIG. 1.

At 210, a vehicle network map may be received or generated by a controller such as 140p. The map may associate multiple endpoint sensor devices such as 110a, 110b with respective vehicle locations and respective physical ports of a network switch such as 130. A virtual area network such as a VLAN may be allocated for configuring each endpoint sensor device and may be associated with a physical port of the network switch. With the vehicle network map, it may be possible to understand the relationships between the vehicle location of each endpoint sensor device and its configuration channel. The vehicle network map may be manually configured by a technician or may be received as a download for a particular type of vehicle.

At 220, the endpoint sensor devices to be installed in the vehicle may be initially configured, including initiating them with the same default or common network address. This may be performed by the manufacturer of the endpoint sensor devices.

At 230, the routing table of a network switch in the vehicle may be pre-configured to associate a first virtual area network with a first physical port and a second virtual area network with a second physical port of the network switch.

In an example, this means that packets received on a first VLAN at a third physical port may be routed (only) to the first physical port and packets received on a second VLAN at the third physical port may be routed (only) to the second physical port. The routing table may be pre-configured manually by an operator or may be configured by the controller using the vehicle network map.

At 240, a technician installs one or more endpoint sensor devices in the vehicle, including electrically connecting them to a network switch. This may be achieved by physically connecting a termination point on a wiring harness which comprises labeling indicating the location and sensor type of the endpoint sensor device to be installed. The other end of the connection may be to a corresponding physical port of the network switch. 210-240 may be performed in any order.

At 250, the method determines that the endpoint sensor device is coupled to the network switch using the common network address. This may be performed by checking that the routing table is loaded and performing a handshaking procedure where a reply request (e.g. Internet Control Message Protocol (ICMP)) is sent over the VLAN allocated for configuring the endpoint sensor device using the default network address and monitoring for a reply.

Alternatively, a message may be sent to the network switch to request the link status of the physical port associated by the routing table with the endpoint sensor device.

At step 260, the controller 140p transmits configuration data for an endpoint sensor device on its associated virtual area network to the third port of the network switch to which the controller is coupled. Sequentially, or simultaneously, the controller may transmit configuration data for other endpoint sensor devices on respective virtual area networks to the third port of the network switch.

At step 270, the network switch transmits to the first endpoint sensor device via the first physical port a command to use a different network address. The command may be addressed using the default network address. In an example, the network switch may simply route packets from the first virtual area network to the first physical port. Similarly, the network switch may transmit to second (and third) endpoint sensor device via the second physical port, a command to use a different network address. This command may also be addressed using the common network address and may be in response to receiving configuration data on a respective second (third) virtual area network from the controller. In this way, each endpoint sensor device may be configured with a respective network address so that it can be distinguished from other endpoint sensor devices within the vehicle.

At step 280, the controller 140p, and any other controllers 140q, communicate with the endpoint sensor devices using their respective updated network addresses. This may include sending and receiving operational data to and from the endpoint sensor devices which may be sent over the respective configuration channels (e.g. individual VLAN) or a common data channel (e.g. a shared VLAN).

Figure 3:
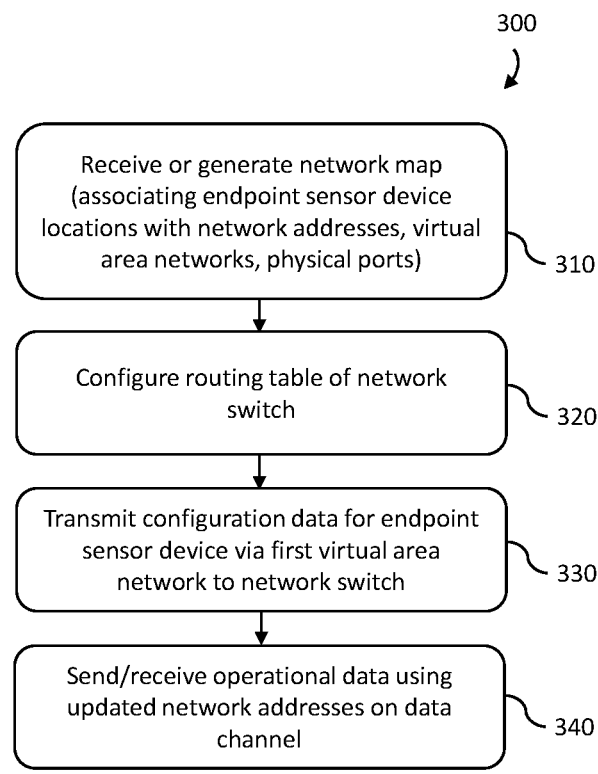
FIG. 3 is a flowchart depicting another example method of configuring one or more processors in a network.

FIG. 3 is a flowchart depicting an example method 300 of a controller of a network. The network may be a vehicle network such as 140 of FIG. 1, and the controller may be the controller 140p of FIG. 1. However, other controllers of other networks may similarly be configured.

At 310, the controller 140p receives or generates a network map which comprises an association between each physical location of an endpoint sensor device and a unique network address of the network. The network map may also comprise an association between each physical location of an endpoint sensor and a virtual area network or configuration channel, as well as a physical port of a network switch. This will enable the controller to assign the appropriate network address to the endpoint sensor devices coupled to the network at each physical location.

At 320, the controller installs in the network switch 130 a pre-configured routing table which associates an endpoint sensor device coupled at a physical location with a virtual area network or configuration channel The routing table controls the network switch to unicast packets from each virtual area network to a respective physical port coupled to an endpoint sensor device. This enables a configuration channel to be set up to each endpoint sensor device which may be independent of every other endpoint sensor device. The routing table may also be set up to multicast packets from a common virtual area network to all physical ports coupled to an endpoint sensor device. This enables a shared data channel to be set up once individual network addresses have been allocated for each endpoint sensor device. The data and configuration channels may be implemented as different VLAN and as noted the VLAN of the configuration channels may be mapped to respective physical ports of the network switch, which correspond to respective endpoint physical locations. Alternatively, this routing table for the network switch may be configured separately from the controller, for example by a technician directly accessing the network controller.

At 330, the controller sends configuration data such as an update address command on a configuration channel to a corresponding endpoint sensor device using a default network address. The update address command instructs the endpoint sensor device to reconfigure its address from the default network address to the network address in the network map. Corresponding commands may be sent to multiple endpoint sensor devices using respective configuration channels.

The controller may receive confirmations from the endpoint sensor devices on their respective configuration channels that they have updated their network addresses.

At 340, the controller sends and/or receives operational data to/from the multiple endpoint sensor devices using their respective updated network addresses. This may be implemented using a common data channel on a shared VLAN for example, or using the configuration VLAN specific to each endpoint sensor device.

Figure 4:
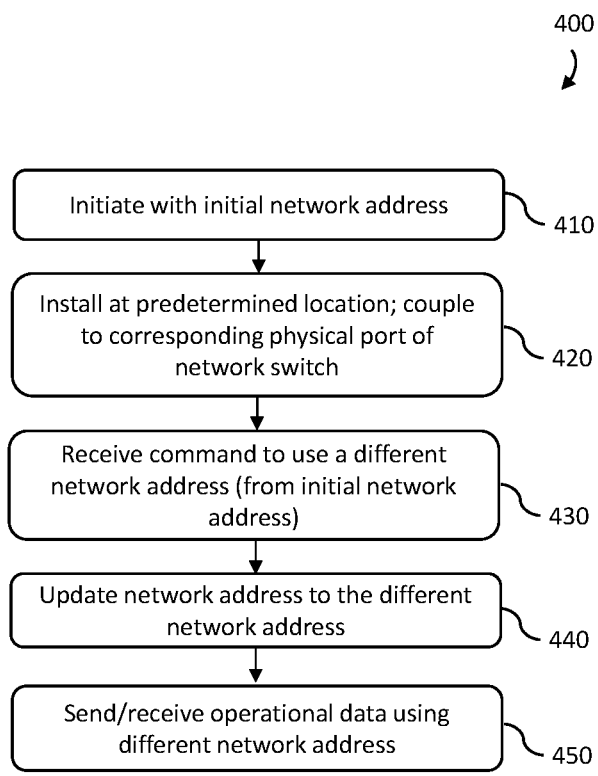
FIG. 4 is a flowchart depicting an example method of configuring an endpoint sensor device in a network.

FIG. 4 is a flowchart depicting an example method 400 of configuring an endpoint sensor device of a network, such as network 140 and endpoint sensor device 110*a* of FIG. 1.

At 410, the endpoint sensor device 110*a*, such as a LIDAR sensor or module, may be initially configured with an initial network address. This may be a default address used by all endpoint sensor devices of the same type.

At 420, the endpoint sensor device may be installed at one of a number of predetermined physical locations of the network. This may correspond to a part of a vehicle and involves coupling the endpoint sensor device to the network. This may be achieved using a suitably labelled wiring loom. A wire may include a label indicating a physical location and an expected type of endpoint sensor device to be located there. This wire may be coupled to a corresponding physical port of a network switch.

At 430, the endpoint sensor device receives a command to update its network address from its default network address, which it will share with other endpoint sensor devices of the same type. The command may have come from a controller 140*p* on a respective VLAN, but this may be transparent to the endpoint sensor device which may only see the command if it has no VLAN functionality.

At 440, the endpoint sensor device 110*a* updates its network address to that included in the command. The endpoint sensor device110*a* may send a confirmation that its network address has been updated. Again, the path to the controller may be transparent to the endpoint sensor device and may include being mapped to a different VLAN in order to propagate to the controller.

At 450, the endpoint sensor device 110*a* sends and/or receives operational data such as LIDAR sensor data using the updated network address.

Figure 5:
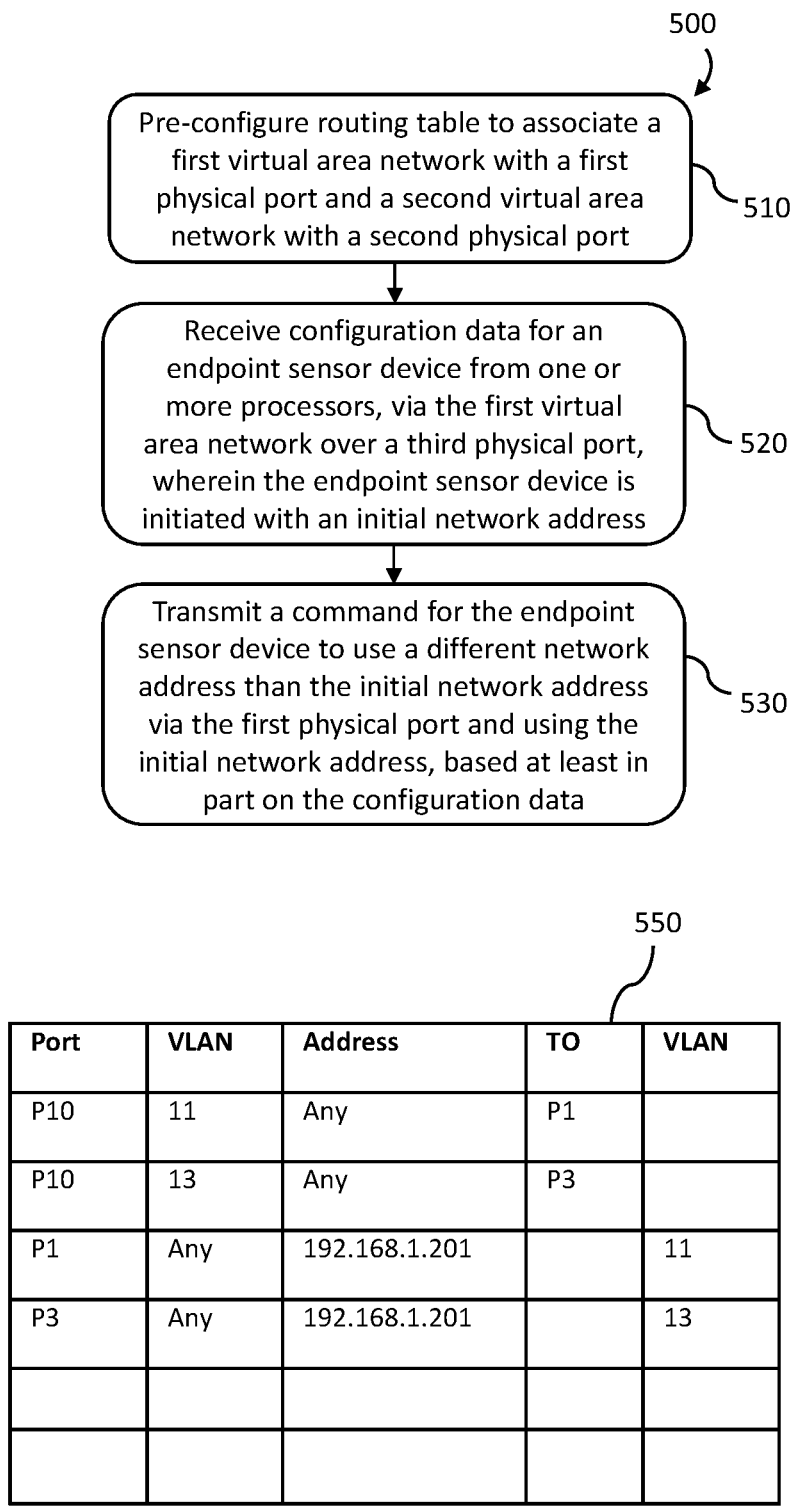
FIG. 5 is a flowchart depicting an example method of configuring a network switch.

FIG. 5 is a flowchart depicting an example method 500 of configuring a network switch of a network, such as the network 140 and the network switch 130 of FIG. 1. At 510, the network switch 130 receives a pre-configured routing table mapping physical ports to virtual area networks such as VLANs corresponding to respective configuration channels for endpoint sensor devices coupled to the physical ports. A routing table 550 is also shown which illustrates how traffic received on a particular port may be mapped. For example, in the first row, traffic received at port P10 on VLAN 11 may be routed or mapped to port P1, corresponding to endpoint sensor device 110*a*. In the second row, traffic received at port P10 on VLAN 13 may be mapped to port P3, corresponding to endpoint sensor device 110*b*. In the third row, traffic received at port P1 may be mapped to VLAN 11 and in the fourth row traffic received at port P3 may be mapped to VLAN 13. Traffic outside that listed in the routing table would be routed according to standard LAN and VLAN rules. For example, where P1, P3 and P10 are all members of VLAN 10 and given network addresses in the same subnet, devices on these ports would be able to communicate commonly. For example, traffic received at port P10 on VLAN 10 from a device with network address 192.168.8.1 may be multicast on ports P1 and P3 to endpoint sensor devices 110*a* and 110*b* with addresses 192.168.8.20 and 192.168.8.21 respectively. In this example, VLAN 11 corresponds to the configuration channel to endpoint sensor device 110*a*, VLAN 13 corresponds to the configuration channel for endpoint sensor device 110*b*, and VLAN 10 corresponds to a shared or common data channel used by both endpoint sensor devices 110*a*, 110*b*. VLAN 11 and VLAN 13 may be used to communicate with only their respective endpoint sensor devices 110*a*, 110*b* and so may be used when these same the same common or default network address. Once their network addresses have been updated and can be used to distinguish the two endpoint sensor devices 110*a*, 110*b*, the shared VLAN 10 may also or alternatively be used. Traffic received at port P1 may be routed to the shared VLAN 10 as the updated network address of the endpoint sensor device 110*a* will be sufficient to distinguish this over traffic received at port P2 from the second endpoint sensor device 110*b* using its updated network address.

At 520, the network switch receives configuration data for an endpoint sensor device 110*a* or 110*b* on a corresponding virtual area network, VLAN 11 or VLAN 13. This is received on a third physical port of the network switch. The configuration data may be transparent to the network switch which may be simply configured by its routing table to route traffic on VLAN 11 to port P1 and the first endpoint sensor device 110*a* and to route traffic on VLAN 13 to port P3 and the second endpoint sensor device 110*b*.

At 530, the network switch transmits a command to the first (or second) endpoint sensor device to use a different network address via the first (second) physical port, using the initial network address and based at least in part on the configuration data. In an example, this may simply be the result of the network switch routing traffic with the initial network address on the first (second) virtual area network onto the first (second) physical port. This traffic will include a command for the endpoint sensor device to change its network address to that included in the command.

Figure 6:
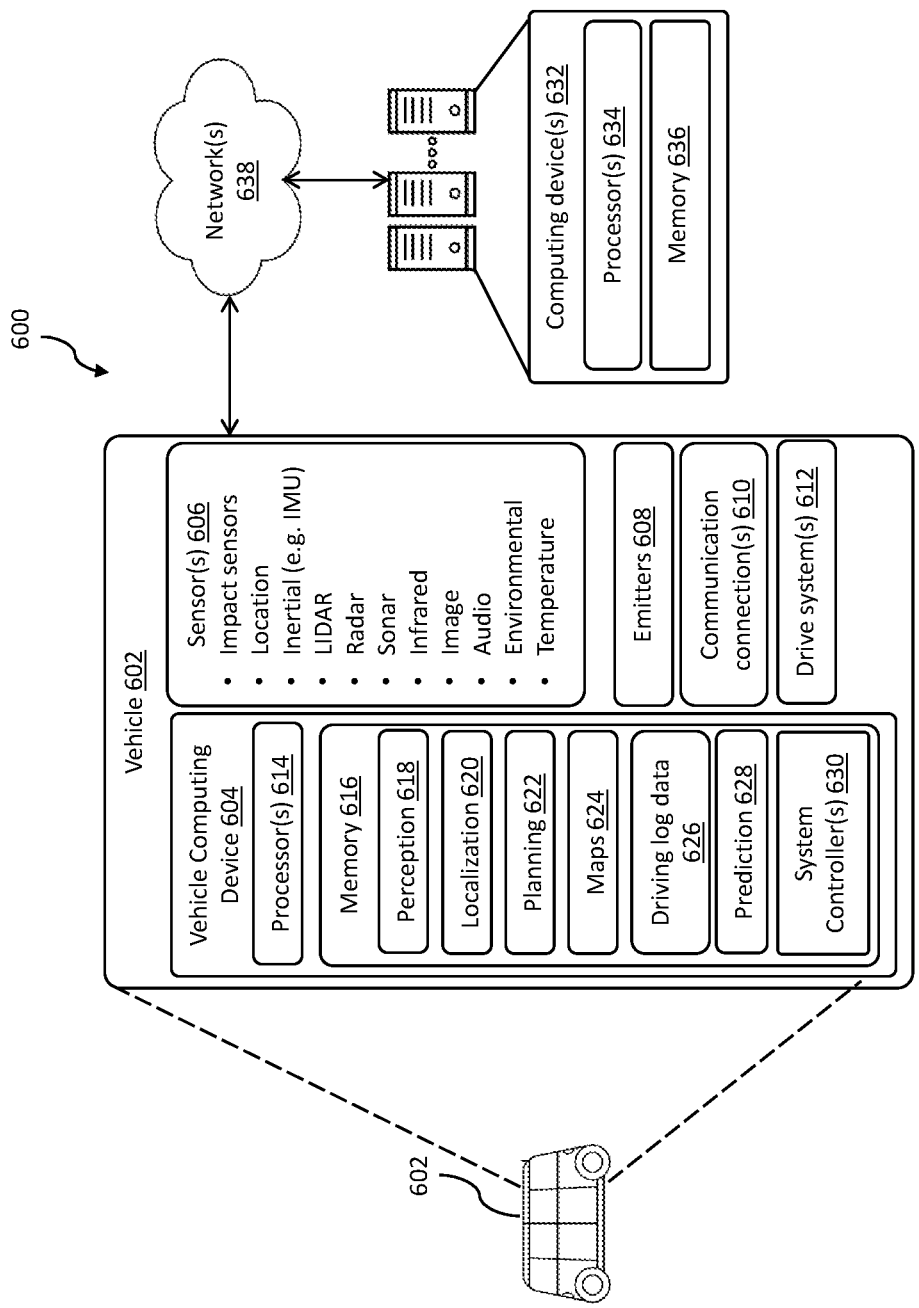
FIG. 6 is a block diagram of an example system for implementing the techniques described herein.

FIG. 6 is a block diagram illustrating an example system 600 for implementing some of the various technologies described herein. In some examples, the system 600 may include one or multiple features, components, and/or functionality of examples described herein with reference to other figures.

The system 600 may include a vehicle 602. In some examples, the vehicle 602 may include some or all of the features, components, and/or functionality described above with respect to the example vehicle 100. As shown in FIG. 6, the vehicle 602 may also include a vehicle computing device 604, one or more sensor systems 606, one or more emitters 608, one or more network interfaces or communication connections 610, and one or more drive systems 612. The vehicle network 120 of FIG. 1 may be equivalent to a combination of one or more of components 604, 606,608, 610 and 612 of FIG. 6.

The vehicle computing device 604 can, in some examples, include one or more processors 614 and memory 616 communicatively coupled with the one or more processors 614. In the illustrated example, the vehicle 602 is an autonomous vehicle; however, the vehicle 602 could be any other type of vehicle (e.g., automobile, truck, bus, aircraft, watercraft, train, etc.), or any other system having components such as those illustrated in FIG. 6. In examples, the one or more processors 614 may execute instructions stored in the memory 616 to perform one or more operations on behalf of the one or more vehicle computing devices 604.

The memory 616 of the one or more vehicle computing devices 604 can store a perception component 618, a localization component 620, a planning component 622, a map(s) component 624, driving log data 626, a prediction component 628, and one or more system controllers 630. Though depicted in FIG. 6 as residing in memory 616 for illustrative purposes, it is contemplated that the perception component 618, the localization component 620, the planning component 622, the map(s) component 624, the log data 626, the prediction component 628, and/or the one or more system controllers 630 can additionally, or alternatively, be accessible to the vehicle 602 (e.g., stored on, or otherwise accessible from, memory remote from the vehicle 602, such as memory 636 of one or more computing devices 632).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 606 or received from one or more other devices (e.g., computing devices 636) to accurately determine a location of the autonomous vehicle 602. In some instances, the localization component 620 can provide data to various components of the vehicle 602 to determine an initial position of the autonomous vehicle 602 for generating a trajectory and/or for determining to retrieve map data. In various examples, the localization component 620 can provide data to a web-based application that may generate a data visualization associated with the vehicle 602 based at least in part on the data.

In some instances, the perception component 618 can include functionality to perform object tracking, detection, segmentation, and/or classification. In some examples, the perception component 618 can provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional and/or alternative examples, the perception component 618 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 618 may provide data to a web-based application that generates a data visualization associated with the vehicle 602 based at least in part on the data.

In general, the planning component 622 can determine a trajectory (sometimes referred to as a planned trajectory or path) for the vehicle 602 to follow to traverse through an environment. For example, the planning component 622 can determine various routes and trajectories and various levels of detail. For example, the planning component 624 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In at least one example, the vehicle computing device 604 can include one or more system controllers 630, which can be configured to control steering, propulsion, braking, safety, emitters, communication, components, and other systems of the vehicle 602. These system controller(s) 630 can communicate with and/or control corresponding systems of the drive assembly(s) or system 612 and/or other components of the vehicle 602.

The memory 616 can further include the map(s) component 624 to maintain and/or update one or more maps (not shown) that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 602 can be controlled based at least in part on the maps. That is, the maps can be used in connection with the localization component 620, the perception component 618, and/or the planning component 622 to determine a location of the vehicle 602, identify objects in an environment, and/or generate routes and/or trajectories to navigate within an environment. Additionally, the maps can be used in connection with the web-based application to generate content associated with the vehicle 602, such as a data visualization.

In some examples, the one or more maps can be stored on a remote computing device(s) (such as the computing device(s) 632) accessible via one or more network(s) 638. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 616 may also store log data 626 associated with the vehicle. For instance, the log data 626 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 626.

In some instances, aspects of some or all of the memory-stored components discussed herein can include any models, algorithms, and/or machine learning algorithms. For example, in some instances, components in the memory 616 (and the memory 636, discussed in further detail below) such as the localization component 620, the perception component 618, and/or the planning component 622 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 606 can include multiple instances of each of these or other types of sensors. For instance, the lidar sensors can include individual lidar sensors located at the corners, front, back, sides, and/or top of the vehicle 602. As another example, the image sensors can include multiple image sensors disposed at various locations about the exterior and/or interior of the vehicle 602. As an even further example, the audio sensors can include multiple audio sensors disposed at various locations about the exterior and/or interior of the vehicle 602. Additionally, the audio sensors can include an array of a plurality of audio sensors for determining directionality of audio data. The sensor system(s) 606 can provide input to the vehicle computing device 604. Additionally, or alternatively, the sensor system (s) 606 can send sensor data, via the one or more networks 638, to the one or more computing device(s) 632 at a particular frequency, after a lapse of a predetermined period of time, in near real-time, etc.

The vehicle 602 can also include one or more emitters 608 for emitting light and/or sound. The emitters 608 in this example include interior audio and visual emitters to communicate with occupants of the vehicle 602. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, laptop computer etc.). The communications connection(s) 610 also enable the vehicle 602 to communicate with a remote teleoperations system or other remote services.

The communications connection(s) 610 can include physical and/or logical interfaces for connecting the vehicle computing device(s) 604 to another computing device (e.g., computing device(s) 632) and/or a network, such as network(s) 638. For example, the communications connection(s) 610 can enable Wi-Fi-based communication such as via frequencies defined by the IEEE 602.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, a direct connection (not shown) of vehicle 602 can provide a physical interface to couple the one or more drive system(s) 612 with the body of the vehicle 602. For example, the direct connection can allow the transfer of energy, fluids, air, data, etc. between the drive system(s) 612 and the vehicle 602. In some instances, the direct connection can further releasably secure the drive system(s) 612 to the body of the vehicle 602.

In at least one example, the vehicle 602 can include one or more drive systems 612. In some examples, the vehicle 602 can have a single drive assembly 612. In at least one example, if the vehicle 602 has multiple drive systems 612, individual drive systems 614 can be positioned on opposite longitudinal ends of the vehicle 602 (e.g., the leading and trailing ends, the front and the rear, etc.).

The drive system(s) 612 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include one or more drive system controllers which can receive and preprocess data from the sensor system(s) and to control operation of the various vehicle systems. In some examples, the drive system controller(s) can include one or more processors and memory communicatively coupled with the one or more processors. The memory can store one or more systems to perform various functionalities of the drive system(s) 612. Furthermore, the drive assembly(s) 612 may also include one or more communication connection(s) that enable communication by the respective drive assembly with one or more other local or remote computing device(s).

The computing device(s) 632 can include one or more processors 634 and memory 636 that may be communicatively coupled to the one or more processors 634. In some examples, the computing device(s) 632 may be associated with a teleoperations system that remotely monitors a fleet of vehicles. Additionally, or alternatively, the computing devices(s) 632 may be leveraged by the teleoperations system to receive and/or process data on behalf of the teleoperations system.

The processor(s) 614 of the vehicle 602 and the processor(s) 634 of the computing device(s) 632 can be any suitable processor capable of executing instructions to process data and perform operations as described herein. By way of example and not limitation, the processor(s) 614 and 634 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 616 and 636 are examples of non-transitory computer-readable media. The memory 616 and 636 can store an operating system and one or more software applications, components, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components of the vehicle 602 of FIG. 6 are described herein as divided for illustrative purposes. However, the operations performed by the various components can be combined or performed in any other component. It should be noted that while FIG. 6 is illustrated as a distributed system, in alternative examples, components of the vehicle 602 can be associated with the computing device(s) 632 and/or components of the computing device(s) 632 can be associated with the vehicle 602. That is, the vehicle 602 can perform one or more of the functions associated with the computing device(s) 632, and vice versa.

Figure 7:
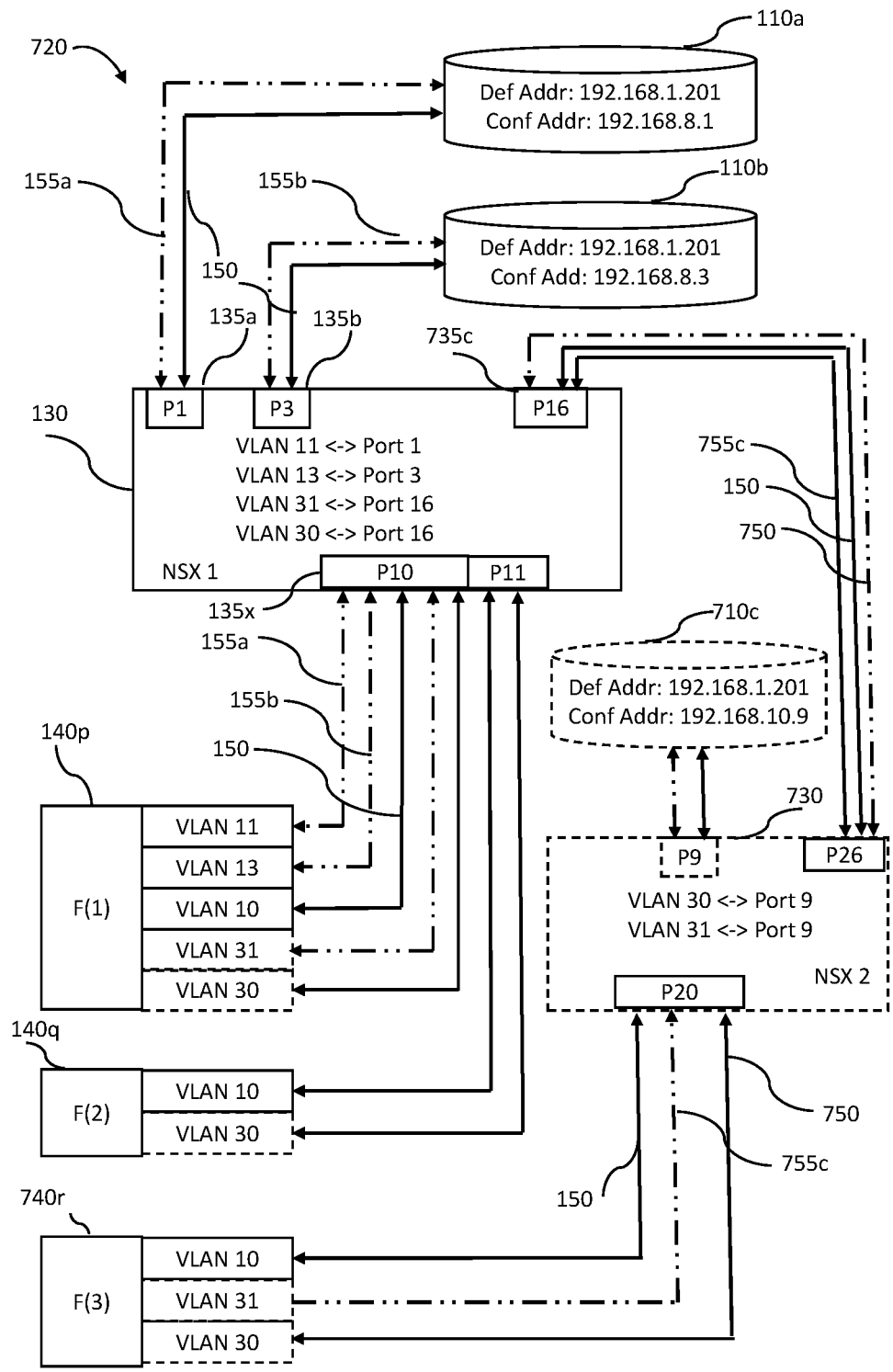
FIG. 7 is a schematic of another example network.

FIG. 7 illustrates a schematic of an example vehicle network. The vehicle network 720 is similar to that of FIG. 1 but having additional components. The components in common with FIG. 1 retain the same references (1xx) and the additional components have new references (7xx). In particular, an additional endpoint sensor device 710c, an additional network switch 730 and an additional controller 740r are shown.

The additional endpoint sensor device 710c may be configured as part of a different subset of endpoint sensor devices than endpoint sensor devices 110a, 110b, with these subsets using different data channels 150 and 750. In an example, endpoint sensor devices in different quadrants of a vehicle may be configured to use different data channels. This may be helpful in managing operational data traffic from different parts of the vehicle, for example prioritizing or load balancing from the same quadrant. Whilst only one endpoint sensor device 710c in the second subset is illustrated for simplicity, it will be appreciated that any number of endpoint sensor devices may be employed in one, two or more subsets of endpoint sensor devices.

In the example illustrated, the additional data channel 750 may be implemented as an additional VLAN (VLAN 30) which carries operational data between endpoint sensor device 730c and the controllers 140p, 140q, 740r. Operational data for the endpoint sensor devices 110a, 110b in the other subset may be carried on the other data channel 150 which may be implemented using VLAN 10. The controllers 140p, 140q, 740r are illustrated as being coupled to both data channels, however this need not be the case and some controllers may only be coupled to one of multiple data channels.

In an example, the data channel 750 and configuration channels 755c for endpoint sensor device 710c in the second subset of endpoint sensor devices may be implemented using the same controller 140p via network switch 130 and 730. The additional endpoint sensor device 710c may be coupled to a respective physical port P16 735c of the network switch 130. The network switch may be configured to map traffic from VLAN 30 at port 10 to VLAN 30 port 16 which may be coupled to the second network switch 730 to ensure a data channel between the controllers and the endpoint sensor device 710c. In order to implement a configuration channel 735c to allow updating of the default network address of the endpoint sensor device 710c, the network switch 130 may be configured to map traffic at port 10 on VLAN 31 to port 16 VLAN 31 which may be coupled to the endpoint sensor device 710c via the second network switch. The controller 140p may then use this configuration channel 755c to update the network address of the endpoint sensor device 710c as previously described.

Port P16 of the first network switch may be coupled to port P26 of the second network switch 730. The second network switch comprises a routing table which maps traffic at port P26 to port P9 for VLAN 31 (configuration channel 755c) and VLAN 30 (data channel 750). This allows the network address of the endpoint sensor device 710c to be updated using VLAN 31 and operational data using the updated network address to be provided to the endpoint sensor device 710c via either VLAN 30 or VLAN 31. A second endpoint sensor device (not shown) may be coupled to the second network switch 730 via a different port and the second network switch 730 may be configured to route traffic on VLAN 30 to both coupled endpoint sensor devices. A separate VLAN configuration channel may be used to reconfigure the network address of the additional endpoint sensor device.

The second network switch 730 may also be configured with the data channel 750 and the configuration channel 755c coupled via port P20 to controller 740r. This provides redundancy for these channels. Here, configuration data may be mapped from port P20 VLAN 31 to port P9 towards the endpoint sensor device 710c. This provides a redundant configuration channel for updating the network address of endpoint sensor device 730c. Once the network address is updated, operational data may be provided to controller 740r via port P20 and VLAN 30 as well as to controller 140p via port P26 VLAN 30 via the first network switch 130. Operational data may alternatively be provided over VLAN 10 via port P20 to controller 740r and to controllers 140p and 140q via port P26 and the first network switch. The first network switch maps this traffic to port P10 for controller 140p and to port P11 for controller 140q. Various other routing table and connection configurations are possible to enable reconfiguring the network addresses of endpoint sensor devices as well as transporting operational data around the network The use of more than one network switch 130, 730 provides additional flexibility, capacity and redundancy for the vehicle network, including facilitating splitting endpoint sensor devices into quadrants. For example, all of the endpoint sensor devices in one quadrant may be coupled to respective physical ports of the same network switch. The network switches may be directly coupled to one or more controllers and/or they may be coupled to each other to enable different redundancy options.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims

EXAMPLE CLAUSES

A: A vehicle comprising: a network switch comprising physical ports and a pre-configured routing table; an endpoint sensor device coupled to the first physical port, wherein the endpoint sensor device is initiated with a network address that is common to another endpoint sensor device, the another endpoint sensor device being one that can be coupled to the second physical port; one or more processors coupled, via a third physical port, to the network switch, wherein the one or more processors are configured to: determine that the endpoint sensor device is coupled to the network switch using the common network address; transmit, via a first virtual area network over the third physical port and to the network switch, configuration data for the endpoint sensor device, wherein the first virtual area network is associated by the pre-configured routing table with the first physical port and wherein a second virtual area network couples the one or more processors to the network switch over the third physical port and is associated by the pre-configured routing table with the second physical port; and wherein the network switch is configured to, based at least in part on receiving the configuration data, transmit, to the endpoint sensor device via the first physical port and using the common network address, a command for the endpoint sensor device to use a different network address than the common network address.

B: A vehicle as clause A, wherein the first and the second physical ports correspond to respective locations on the vehicle for endpoint sensor devices coupled to said ports.

C: A vehicle as clause A or B, wherein: the one or more processors is configured to transmit, via a third virtual area network over the third physical port and to the network switch, operational data, wherein the third virtual network is associated by the pre-configured routing table with the first and the second physical ports; and the network switch is configured to, based at least in part on receiving the operational data, transmit the operational data to the endpoint sensor device via the first physical port and using the different network address.

D: A vehicle as clauses A to C, wherein the first virtual area network and the second virtual area network are Virtual Local Area Networks (VLAN).

E: A vehicle as clauses A to D, wherein the network switch is configured to prevent transmission of data from the endpoint sensor device to the one or more processors or to another endpoint sensor device using the common network address.

F; A vehicle as clauses A to E, comprising: a second network switch comprising physical ports and a second pre-configured routing table; a second endpoint sensor device coupled to the first physical port of the second network switch, wherein the second endpoint sensor device is initiated with the common network address; the one or more processors coupled, via a third physical port of the second network switch, to the second network switch; wherein the one or more processors is configured to: transmit, via a fourth virtual area network over the third physical port of the second network switch, to the network switch configuration data for the second endpoint sensor device wherein the fourth virtual area network is associated by the second pre-configured routing table of the second network switch with the first physical port of the second network switch and wherein a fifth virtual area network couples the one or more processors to the second network switch over the third physical port of the second network switch and is associated by the pre-configured routing table of the second network switch with the second physical port of the second network switch; and wherein the second network switch is configured to, based at least in part on receiving the configuration data, transmit, to the second endpoint sensor device via the first physical port of the second network switch and using the common network address, a command for the second endpoint sensor device to use a different network address than the common network address.

G: A vehicle as clause F, comprising first and second sensor pods each comprising one or more endpoint sensor devices, the one of more endpoint sensor devices of the first sensor pod coupled to the first network switch and the one or more endpoint sensor devices of the second sensor pod couple to the second network switch.

H: A vehicle as clauses A to G, wherein: the one or more additional processors are configured to transmit, via the first virtual area network over the third physical port and to the network switch, operational data, wherein the third virtual network is associated by the pre-configured routing table with the first and the second physical ports; and wherein the network switch is configured to, based at least in part on receiving the operational data, transmit the operational data to the endpoint sensor device via the first physical port and using the different network address.

I: A network comprising: a network switch comprising first, second and third physical ports and a pre-configured routing table; an endpoint sensor device coupled to the first physical port, wherein the endpoint sensor device is initiated with an initial network address; one or more processors coupled, via the third physical port, to the network switch, wherein the one or more processors are configured to: transmit, via a first virtual area network over the third physical port, to the network switch configuration data for the endpoint sensor device, wherein the first virtual area network is associated by the pre-configured routing table with the first physical port and wherein a second virtual area network couples the one or more processors to the network switch over the third physical port and is associated by the pre-configured routing table with the second physical port; and wherein the network switch is configured to, based at least in part on receiving the configuration data, transmit, to the endpoint sensor device via the first physical port and using the initial network address, a command for the endpoint sensor device to use a different network address than the initial network address.

J: A network as clause I, wherein the one or more processors are configured to: transmit, via a third virtual area network over the third physical port, to the network switch, operational data, wherein the third virtual network is associated by the pre-configured routing table with the first and the second physical ports; and the network switch is configured to, based at least in part on receiving the operational data, transmit the operational data to at least the first physical port using the different network address.

K: A network as clause I or J, wherein the one or more processors are configured to: transmit, via the first virtual area network over the third physical port, to the network switch, operational data; and the network switch is configured to, based at least in part on receiving the operational data, transmit the operational data to the endpoint sensor device via the first physical port using the different network address.

L: A network as clause K, wherein the network switch is configured to prevent transmission of data from the endpoint sensor device to the one or more processors or another endpoint sensor device using the initial network address.

M: A network as clause K, comprising: a second network switch comprising first, second and third physical ports and a second pre-configured routing table; a second endpoint device coupled to the first physical port of the second network switch, wherein the second endpoint device is initiated with the initial network address; the one or more processors coupled, via the third physical port of the second network switch, to the second network switch, wherein the one or more processors are configured to: transmit, via a fourth virtual area network over the third physical port of the second network switch, to the second network switch configuration data for the second endpoint sensor device wherein the fourth virtual area network is associated by the second pre-configured routing table with the first physical port of the second network switch; and wherein the second network switch is configured to, based at least in part on receiving the configuration data, transmit, to the second endpoint sensor device via the first physical port of the second network switch and using the initial network address, a command for the second endpoint sensor device to use another different network address than the initial network address.

N: A network as clause M, wherein the one or more processors are configured to: transmit, via a third virtual area network over the third physical port of the first network switch, operational data to the first network switch; and wherein the first network switch is configured to, based at least in part on receiving the operational data, transmit the operational data to at least the first and the second physical ports of the first network switch; transmit, via a fifth virtual area network over the third physical port of the second network switch, to the second network switch, operational data; and wherein the second network switch is configured to, based at least in part on receiving the operational data, transmit the operational data to at least the first and the second physical ports of the second network switch.

O: A network as clause claim I to N, comprising: a second network switch comprising first, second and third physical ports and a second pre-configured routing table; a second endpoint device coupled to the first physical port of the second network switch, wherein the second endpoint device is initiated with the initial network address; the one or more processors coupled, via a fourth physical port of the first network switch to the third one of the physical ports of the second switch, to the second network switch; wherein the one or more processors are configured to: transmit, via a sixth virtual area network over the third physical port of the first network switch, to the second network switch, configuration data for the second endpoint sensor device wherein the sixth virtual area network is associated by the first pre-configured routing table with the fourth physical port of the first network switch; and the second network switch is configured to, based at least in part on receiving the configuration data, transmit, to the second endpoint sensor device via the first physical port of the second network switch and using the initial network address, a command for the second endpoint sensor device to use another different network address than the initial network address.

P: A method of configuring a network comprising a network switch comprising a first, a second and a third physical port, an endpoint sensor device coupled to the first physical port wherein the endpoint sensor device is initiated with an initial network address, and one or more processors coupled, via the third physical port, to the network switch; the method comprising: configuring a routing table in the network switch to associate a first virtual area network with the first physical port and a second virtual area network with the second physical port; transmitting configuration data for the endpoint sensor device from the one or more processors, via the first virtual area network over the third physical port, to the network switch; and transmitting a command for the endpoint sensor device to use a different network address than the initial network address from the network switch to the endpoint sensor device via the first physical port and using the initial network address, based at least in part on receiving the configuration data.

Q: A method as clause P, comprising: configuring a routing table in the network switch to associate a third virtual area network with the first and second ports; transmitting from the one or more processors, via the third virtual area network over the third physical port, operational data to the network switch; transmitting the operational data from the network switch to at least the first and the second physical ports, based at least in part on receiving the operational data.

R: A method as clause P or Q, comprising: transmitting from the one or more processors, via the first virtual area network over the third physical port, operational data to the network switch; transmitting the operational data from the network switch to the endpoint sensor device via the first physical port and using the different network address.

S: A method as clause P to R, comprising: configuring the network switch to prevent transmission of data from the endpoint sensor device to the one or more processors or another endpoint sensor device using the initial network address.

T: A method as clause P to S, comprising: configuring the routing table in the network switch to associate a second virtual area network with the second physical port; transmitting configuration data for a second endpoint sensor device from the one or more processors, via the second virtual area network over the third physical port, to the network switch; and transmitting a command for the second endpoint sensor device to use another different network address than the initial network address from the network switch to the endpoint sensor device via the second physical port and using the initial network address, based at least in part on receiving the configuration data.

U: One or more non-transitory computer-readable media storing instructions executable by one or more processors, wherein the instructions, when executed, cause the one or more processors to perform operations comprising: configuring a routing table in the network switch to associate a first virtual area network with the first physical port and a second virtual area network with the second physical port; transmitting configuration data for the endpoint sensor device from the one or more processors, via the first virtual area network over the third physical port, to the network switch; and transmitting a command for the endpoint sensor device to use a different network address than the initial network address from the network switch to the endpoint sensor device via the first physical port and using the initial network address, based at least in part on receiving the configuration data.

While the example clauses described above are described with respect to one particular implementation, it should be understood that, in the context of this document, the content of the example clauses can also be implemented via a method, device, system, computer-readable medium, and/or another implementation. Additionally, any of examples A-U may be implemented alone or in combination with any other one or more of the examples A-U.

What is claimed is:

1. A vehicle comprising:
a network switch comprising first, second and third physical ports and a pre-configured routing table;
an endpoint sensor device coupled to the first physical port, wherein the endpoint sensor device is initiated with a network address that is common to another endpoint sensor device, the another endpoint sensor device being one that can be coupled to the second physical port;
one or more processors coupled, via a third physical port, to the network switch, wherein the one or more processors are configured to:
determine that the endpoint sensor device is coupled to the network switch using the common network address;
transmit, via a first virtual area network over the third physical port and to the network switch, configuration data for the endpoint sensor device,
wherein the first virtual area network is associated by the pre-configured routing table with the first physical port and wherein a second virtual area network couples the one or more processors to the network switch over the third physical port and is associated by the pre-configured routing table with the second physical port; and
wherein the network switch is configured to, based at least in part on receiving the configuration data, transmit, to the endpoint sensor device via the first physical port and using the common network address, a command for the endpoint sensor device to use a different network address than the common network address.

2. The vehicle of claim 1, wherein the first and the second physical ports correspond to respective locations on the vehicle for endpoint sensor devices coupled to said ports.

3. The vehicle of claim 1, wherein:
the one or more processors is configured to transmit, via a third virtual area network over the third physical port and to the network switch, operational data, wherein the third virtual network is associated by the pre-configured routing table with the first and the second physical ports; and
the network switch is configured to, based at least in part on receiving the operational data, transmit the operational data to the endpoint sensor device via the first physical port and using the different network address.

4. The vehicle of claim 1, wherein the first virtual area network and the second virtual area network are Virtual Local Area Networks (VLAN).

5. The vehicle of claim 1, wherein the network switch is configured to prevent transmission of data from the endpoint sensor device to the one or more processors or to another endpoint sensor device using the common network address.

6. The vehicle of claim 1, comprising:
a second network switch comprising first, second and third physical ports and a second pre-configured routing table;
a second endpoint sensor device coupled to the first physical port of the second network switch, wherein the second endpoint sensor device is initiated with the common network address;
the one or more processors coupled, via a third physical port of the second network switch, to the second network switch; wherein the one or more processors is configured to:
transmit, via a fourth virtual area network over the third physical port of the second network switch, to the network switch configuration data for the second endpoint sensor device wherein the fourth virtual area network is associated by the second pre-configured routing table of the second network switch with the first physical port of the second network switch and wherein a fifth virtual area network couples the one or more processors to the second network switch over the third physical port of the second network switch and is associated by the pre-configured routing table of the second network switch with the second physical port of the second network switch; and wherein the second network switch is configured to, based at least in part on receiving the configuration data, transmit, to the second endpoint sensor device via the first physical port of the second network switch and using the common network address, a command for the second endpoint sensor device to use a different network address than the common network address.

7. The vehicle of claim 6, comprising first and second sensor pods each comprising one or more endpoint sensor devices, the one of more endpoint sensor devices of the first sensor pod coupled to the first network switch and the one or more endpoint sensor devices of the second sensor pod couple to the second network switch.

8. The vehicle of claim 1, wherein:
the one or more additional processors are configured to transmit, via the first virtual area network over the third physical port and to the network switch, operational data, wherein the third virtual network is associated by the pre-configured routing table with the first and the second physical ports; and
wherein the network switch is configured to, based at least in part on receiving the operational data, transmit the operational data to the endpoint sensor device via the first physical port and using the different network address.

9. A network comprising:
a network switch comprising first, second and third physical ports and a pre-configured routing table;
an endpoint sensor device coupled to the first physical port, wherein the endpoint sensor device is initiated with an initial network address;
one or more processors coupled, via the third physical port, to the network switch, wherein the one or more processors are configured to:
transmit, via a first virtual area network over the third physical port, to the network switch configuration data for the endpoint sensor device,
wherein the first virtual area network is associated by the pre-configured routing table with the first physical port and wherein a second virtual area network couples the one or more processors to the network switch over the third physical port and is associated by the pre-configured routing table with the second physical port; and
wherein the network switch is configured to, based at least in part on receiving the configuration data, transmit, to the endpoint sensor device via the first physical port and using the initial network address, a command for the endpoint sensor device to use a different network address than the initial network address.

10. The network of claim 9, wherein the one or more processors are configured to:
transmit, via a third virtual area network over the third physical port, to the network switch, operational data, wherein the third virtual network is associated by the pre-configured routing table with the first and the second physical ports; and
the network switch is configured to, based at least in part on receiving the operational data, transmit the operational data to at least the first physical port using the different network address.

11. The network of claim 9, wherein the one or more processors are configured to:
transmit, via the first virtual area network over the third physical port, to the network switch, operational data; and
the network switch is configured to, based at least in part on receiving the operational data, transmit the operational data to the endpoint sensor device via the first physical port using the different network address.

12. The network of claim 9, wherein the network switch is configured to prevent transmission of data from the endpoint sensor device to the one or more processors or another endpoint sensor device using the initial network address.

13. The network of claim 9, comprising:
a second network switch comprising first, second and third physical ports and a second pre-configured routing table;
a second endpoint sensor device coupled to the first physical port of the second network switch, wherein the second endpoint sensor device is initiated with the initial network address;
the one or more processors coupled, via the third physical port of the second network switch, to the second network switch, wherein the one or more processors are configured to:
transmit, via a fourth virtual area network over the third physical port of the second network switch, to the second network switch configuration data for the second endpoint sensor device wherein the fourth virtual area network is associated by the second pre-configured routing table with the first physical port of the second network switch; and
wherein the second network switch is configured to, based at least in part on receiving the configuration data, transmit, to the second endpoint sensor device via the first physical port of the second network switch and using the initial network address, a command for the second endpoint sensor device to use another different network address than the initial network address.

14. The network of claim 13, wherein the one or more processors are configured to:
transmit, via a third virtual area network over the third physical port of the first network switch, operational data to the first network switch; and
wherein the first network switch is configured to, based at least in part on receiving the operational data, transmit the operational data to at least the first and the second physical ports of the first network switch;
transmit, via a fifth virtual area network over the third physical port of the second network switch, to the second network switch, operational data; and
wherein the second network switch is configured to, based at least in part on receiving the operational data, transmit the operational data to at least the first and the second physical ports of the second network switch.

15. The network of claim 9, comprising:
a second network switch comprising first, second and third physical ports and a second pre-configured routing table;
a second endpoint sensor device coupled to the first physical port of the second network switch, wherein the second endpoint sensor device is initiated with the initial network address;

the one or more processors coupled, via a fourth physical port of the first network switch to the third one of the physical ports of the second switch, to the second network switch;

wherein the one or more processors are configured to:

transmit, via a sixth virtual area network over the third physical port of the first network switch, to the second network switch, configuration data for the second endpoint sensor device wherein the sixth virtual area network is associated by the first pre-configured routing table with the fourth physical port of the first network switch; and the second network switch is configured to, based at least in part on receiving the configuration data, transmit, to the second endpoint sensor device via the first physical port of the second network switch and using the initial network address, a command for the second endpoint sensor device to use another different network address than the initial network address.

16. A method of configuring a network comprising a network switch comprising a first, a second and a third physical port, an endpoint sensor device coupled to the first physical port wherein the endpoint sensor device is initiated with an initial network address, and one or more processors coupled, via the third physical port, to the network switch; the method comprising:

configuring a routing table in the network switch to associate a first virtual area network with the first physical port and a second virtual area network with the second physical port;

transmitting configuration data for the endpoint sensor device from the one or more processors, via the first virtual area network over the third physical port, to the network switch; and transmitting a command for the endpoint sensor device to use a different network address than the initial network address from the network switch to the endpoint sensor device via the first physical port and using the initial network address, based at least in part on receiving the configuration data.

17. The method of claim 16, comprising:

configuring a routing table in the network switch to associate a third virtual area network with the first and second ports;

transmitting from the one or more processors, via the third virtual area network over the third physical port, operational data to the network switch;

transmitting the operational data from the network switch to at least the first and the second physical ports, based at least in part on receiving the operational data.

18. The method of claim 16, comprising:

transmitting from the one or more processors, via the first virtual area network over the third physical port, operational data to the network switch;

transmitting the operational data from the network switch to the endpoint sensor device via the first physical port and using the different network address.

19. The method of claim 16, comprising:

configuring the network switch to prevent transmission of data from the endpoint sensor device to the one or more processors or another endpoint sensor device using the initial network address.

20. The method of claim 16, comprising:

configuring the routing table in the network switch to associate a second virtual area network with the second physical port;

transmitting configuration data for a second endpoint sensor device from the one or more processors, via the second virtual area network over the third physical port, to the network switch; and transmitting a command for the second endpoint sensor device to use another different network address than the initial network address from the network switch to the endpoint sensor device via the second physical port and using the initial network address, based at least in part on receiving the configuration data.

* * * * *